United States Patent
Ikenaga

(10) Patent No.: US 9,868,061 B2
(45) Date of Patent: Jan. 16, 2018

(54) INFORMATION PROCESSING SYSTEM, INFORMATION PROCESSING METHOD, INFORMATION PROCESSING PROGRAM, COMPUTER-READABLE RECORDING MEDIUM ON WHICH INFORMATION PROCESSING PROGRAM IS RECORDED, AND INFORMATION PROCESSING DEVICE

(71) Applicant: Sony Computer Entertainment Inc., Tokyo (JP)

(72) Inventor: Toshiya Ikenaga, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 653 days.

(21) Appl. No.: 14/377,394

(22) PCT Filed: Oct. 26, 2012

(86) PCT No.: PCT/JP2012/077807
§ 371 (c)(1),
(2) Date: Aug. 7, 2014

(87) PCT Pub. No.: WO2013/128709
PCT Pub. Date: Sep. 6, 2013

(65) Prior Publication Data
US 2015/0011313 A1    Jan. 8, 2015

(30) Foreign Application Priority Data
Mar. 2, 2012  (JP) .................................. 2012-047242

(51) Int. Cl.
*A63F 13/30*    (2014.01)
*A63F 13/358*    (2014.01)
(Continued)

(52) U.S. Cl.
CPC ............ *A63F 13/358* (2014.09); *A63F 13/30* (2014.09); *A63F 2300/534* (2013.01)

(58) Field of Classification Search
CPC ........... G06F 3/1462; H04N 21/4122–21/4432
See application file for complete search history.

(56) References Cited

U.S. PATENT DOCUMENTS 6,672,963 B1 * 1/2004 Link ........................ A63F 13/10
463/43
7,445,551 B1 * 11/2008 Okada ..................... A63F 13/00
463/43

(Continued)

FOREIGN PATENT DOCUMENTS

| CN | 1921915 A | 2/2007 |
| CN | 101180107 A | 5/2008 |

(Continued)

OTHER PUBLICATIONS

Office Action for corresponding CN application No. 201280070708.3, 8 pages, dated Feb. 3, 2016.

(Continued)

*Primary Examiner* — Wing F Chan
*Assistant Examiner* — Raji Krishnan
(74) *Attorney, Agent, or Firm* — Matthew B. Dernier, Esq.

(57) ABSTRACT

The moving images of a program being executed on one terminal can be effectively viewed on another terminal even if the state of communication between the program-executing terminal and the server or the other terminal is not good. There is provided an information processing system including: a first information processing device including first operation information acquisition section which sequentially acquires operation information input by a user, first execution section which executes an application using the operation information acquired sequentially by the first operation (Continued)

information acquisition section, and operation information transmission section which sequentially transmits the operation information via a network; and a second information processing device including second operation information acquisition section which sequentially acquires the operation information transmitted from the first operation information transmission section, and second execution section which executes the application using the operation information acquired sequentially by the second operation information acquisition section.

9 Claims, 6 Drawing Sheets

(51) Int. Cl.
*A63F 13/00* (2014.01)
*A63F 13/40* (2014.01)

(56) References Cited

U.S. PATENT DOCUMENTS

| | | | |
|---|---|---|---|
| 7,878,890 | B2 | 2/2011 | Toyohara |
| 8,235,778 | B2 | 8/2012 | Takahashi |
| 2002/0086730 | A1 | 7/2002 | Nakai |
| 2003/0003977 | A1 | 1/2003 | Takahashi |
| 2004/0125110 | A1* | 7/2004 | Kohda ................ G06F 3/1462 |
| | | | 345/501 |
| 2004/0128145 | A1 | 7/2004 | Sato |
| 2004/0224774 | A1 | 11/2004 | Nakai |
| 2006/0276241 | A1 | 12/2006 | Toyohara |
| 2008/0254888 | A1* | 10/2008 | Morio ..................... A63F 13/10 |
| | | | 463/42 |
| 2009/0137296 | A1 | 5/2009 | Takahashi |
| 2009/0262661 | A1* | 10/2009 | Ueda ................. H04N 1/00294 |
| | | | 370/254 |
| 2012/0329557 | A1 | 12/2012 | Takamura |

FOREIGN PATENT DOCUMENTS

| | | |
|---|---|---|
| EP | 1270052 A3 | 1/2003 |
| JP | 2000157724 A | 6/2000 |
| JP | 2002253866 A | 9/2002 |
| JP | 2003010549 A | 1/2003 |
| JP | 2003103059 A | 4/2003 |
| JP | 2003175284 A | 6/2003 |
| JP | 2006263069 A | 10/2006 |
| JP | 2011072735 A | 4/2011 |
| WO | 2002035414 A1 | 5/2002 |
| WO | 2011125265 A1 | 10/2011 |

OTHER PUBLICATIONS

Decision to Grant for corresponding JP application No. 2014-501959, 5 pages, dated May 24, 2016.

International Search Report for corresponding application No. PCT/JP2012/077807, dated Jan. 29, 2013.

International Preliminary Report on Patentability and Written Opinion for corresponding application No. PCT/JP2012/077807, dated Sep. 12, 2014.

Office Action for corresponding JP application No. 2014501959, dated Apr. 28, 2015.

* cited by examiner

INFORMATION PROCESSING SYSTEM, INFORMATION PROCESSING METHOD, INFORMATION PROCESSING PROGRAM, COMPUTER-READABLE RECORDING MEDIUM ON WHICH INFORMATION PROCESSING PROGRAM IS RECORDED, AND INFORMATION PROCESSING DEVICE

TECHNICAL FIELD

The present invention relates to an information processing system, an information processing method, an information processing program, a computer-readable recording medium on which the information processing program is recorded, and an information processing device.

BACKGROUND ART

There are known technologies for storing in a server the moving images in which game plays are recorded and allowing the server to distribute the moving images to terminals so that a given user's game play images may be viewed by other users.

SUMMARY

Technical Problem

In this context, suppose that the images of a game program being played on one terminal are desired to be viewed on another terminal, for example. In such a case, it may become difficult to distribute game image information from the terminal on which the game is being executed to the server or the other terminal depending on the state of communication between the game-executing terminal and the server or the other terminal or on the network bandwidth in effect.

The present invention has been made in view of the above circumstances, and an object of the invention is to provide an information processing system, an information processing method, an information processing program, a computer-readable recording medium on which the information processing program is recorded, and an information processing device whereby the play images of a game program being executed on one terminal can be effectively viewed on another terminal even if the state of communication between the program-executing terminal and the other terminal or the server is not good or even if the network bandwidth is narrow.

Solution to Problem (1) There is provided an information processing system including: a first information processing device including first operation information acquisition means which sequentially acquires operation information input by a user, first execution means which executes an application using the operation information acquired sequentially by the first operation information acquisition means, and operation information transmission means which sequentially transmits the operation information via a network; and a second information processing device including second operation information acquisition means which sequentially acquires the operation information transmitted from the first operation information transmission means, and second execution means which executes the application using the operation information acquired sequentially by the second operation information acquisition means.

(2) In the information processing system described in paragraph (1) above, the first information processing device may further include first execution state information acquisition means which acquires execution state information representing an execution state of the first execution means, and execution state information transmission means which transmits via the network the execution state information acquired by the first execution state information acquisition means; and the second information processing device may further include second execution state information acquisition means which acquires the execution state information from the first execution state information transmission means. The second execution means may execute the application using the execution state information acquired by the second execution state information acquisition means.

(3) In the information processing system described in paragraph (1) or (2) above, the second information processing device may further include image information transmission means which transmits image information based on the execution of the application by the second execution means. The information processing system may further include a third information processing device including image information reproduction means which reproduces the image information from the image information transmission means, and display means which displays the image information reproduced by the image information reproduction means.

(4) In the information processing system described in paragraph (1) or (2) above, the second information processing device may further include image information display means based on the execution of the application by the second execution means. The image information display means may display the image information while the application is being executed by the first execution means.

(5) In the information processing system described in paragraph (3) above, the image information reproduction means may reproduce the image information from the image information transmission means while the application is being executed by the first execution means.

(6) According to the present invention, there is also provided an information processing method including: causing first operation information acquisition means sequentially to acquire operation information input by a user; causing first execution means to execute an application using the operation information acquired sequentially by the first operation information acquisition means; causing operation information transmission means sequentially to transmit the operation information via a network; causing second operation information acquisition means sequentially to acquire the operation information transmitted from the first operation information transmission means; and causing second execution means to execute the application using the operation information acquired sequentially by the second operation information acquisition means. The first operation information acquisition means, the first execution means, and the operation information transmission means may be included in a first information processing device whereas the second operation information acquisition means and the second execution means may be included in a second information processing device.

(7) According to the present invention, there is also provided an information processing program for causing a computer system to function as: first information processing means including first operation information acquisition means which sequentially acquires operation information input by a user, first execution means which executes an application using the operation information acquired sequentially by the first operation information acquisition means, and operation information transmission means which sequentially transmits the operation information via a network; and second information processing means including second operation information acquisition means which sequentially acquires the operation information transmitted from the first operation information transmission means, and second execution means which executes the application using the operation information acquired sequentially by the second operation information acquisition means.

(8) There may also be provided a computer-readable recording medium on which the information processing program described in paragraph (7) above is recorded.

(9) According to the present invention, there is also provided a first information processing device including: first operation information acquisition means which sequentially acquires operation information input by a user; first execution means which executes an application using the operation information acquired sequentially by the first operation information acquisition means; and operation information transmission means which sequentially transmits the operation information via a network. The operation information transmitted from the first operation information transmission means is acquired sequentially by second operation information acquisition means included in a second information processing device, the application being executed by second execution means included in the second information processing device using the operation information acquired sequentially by the second operation information acquisition means.

(10) According to the present invention, there is also provided a second information processing device including: second operation information acquisition means which sequentially acquires operation information transmitted from first operation information transmission means via a network, the operation information having been input by a user and acquired sequentially by first operation information acquisition means included in a first information processing device; and second execution means which executes an application using the operation information acquired sequentially by the second operation information acquisition means. First execution means included in the first information processing device executes the application using the operation information acquired sequentially by the first operation information acquisition means.

(11) In the information processing system described in any one of paragraphs (1) through (5) above, the first information processing device may further include execution state information storage means which stores execution state information representing a predetermined execution state of the first execution state; and the first execution means may execute the application using the stored execution state information.

(12) According to the present invention, there is also provided an information processing system including a first information processing device and a second information processing device interconnected with each other via a network. The first information processing device includes: first execution means which executes an application program; first operation information acquisition means which acquires first operation information about continuation of the execution of the application program by the second information processing device; first execution state information acquisition means which acquires execution state information representing an execution state of the first execution means in conjunction with the acquisition of the first operation information; and first application program acquisition means which acquires the application program in conjunction with the acquisition of the first operation information. The second information processing device includes: second operation information transmission means which transmits the first operation information; second execution state information acquisition means which acquires the execution state information acquired by the first execution state information acquisition means; second application program acquisition means which acquires the application program acquired by the first application program acquisition means; and second execution means which executes the second application program using the execution state information acquired by the second execution state information acquisition means.

(13) According to the present invention, there is also provided an information processing method including: causing first execution means to execute an application program; causing first operation information acquisition means to acquire first operation information about continuation of the execution of the application program by the second information processing device; causing first execution state information acquisition means to acquire execution state information representing an execution state of the first execution means in conjunction with the acquisition of the first operation information; causing application program acquisition means to acquire the application program in conjunction with the acquisition of the first operation information; causing second operation information transmission means to transmit the first operation information; causing second execution state information acquisition means to acquire the execution state information acquired by the first execution state information acquisition means; causing second application program acquisition means to acquire the application program acquired by the first application program acquisition means; and causing second execution means to execute the second application program using the execution state information acquired by the second execution state information acquisition means.

(14) According to the present invention, there is also provided an information processing program for causing a computer system to function as: the first information processing means including first execution means which executes an application program, first operation information acquisition means which acquires first operation information about continuation of the execution of the application program by the second information processing device, first execution state information acquisition means which acquires execution state information representing an execution state of the first execution means in conjunction with the acquisition of the first operation information, and first application program acquisition means which acquires the application program in conjunction with the acquisition of the first operation information; and second information processing means including, second operation information transmission means which transmits the first operation information, second execution state information acquisition means which acquires the execution state information acquired by the first execution state information acquisition means, second application program acquisition means which acquires the application program acquired by the first application program acquisition means, and second execution means which executes the second application program using the execution state information acquired by the second execution state information acquisition means.

(15) According to the present invention, there is also provided a first information processing device including: first execution means which executes an application program; first operation information acquisition means which acquires first operation information about continuation of the execution of the application program by second execution means different from the first execution means; first execution state information acquisition means which acquires execution state information representing an execution state of the first execution means in conjunction with the acquisition of the first operation information; and first application program acquisition means which acquires the application program in conjunction with the acquisition of the first operation information.

(16) According to the present invention, there is also provided a second information processing device including: second operation information transmission means which transmits first operation information about continuation of the execution, by second execution means, of an application program executed by first execution means; second execution state information acquisition means which acquires execution state information representing an execution state of the first execution means, the execution state information being acquired in conjunction with the first operation information; second application program acquisition means which acquires the application program acquired by the first execution means; and execution means which executes the application program acquired by the second application program acquisition means, the application program being executed using the execution state information acquired by the second execution state information acquisition means.

DESCRIPTION OF EMBODIMENTS

Figure 1:
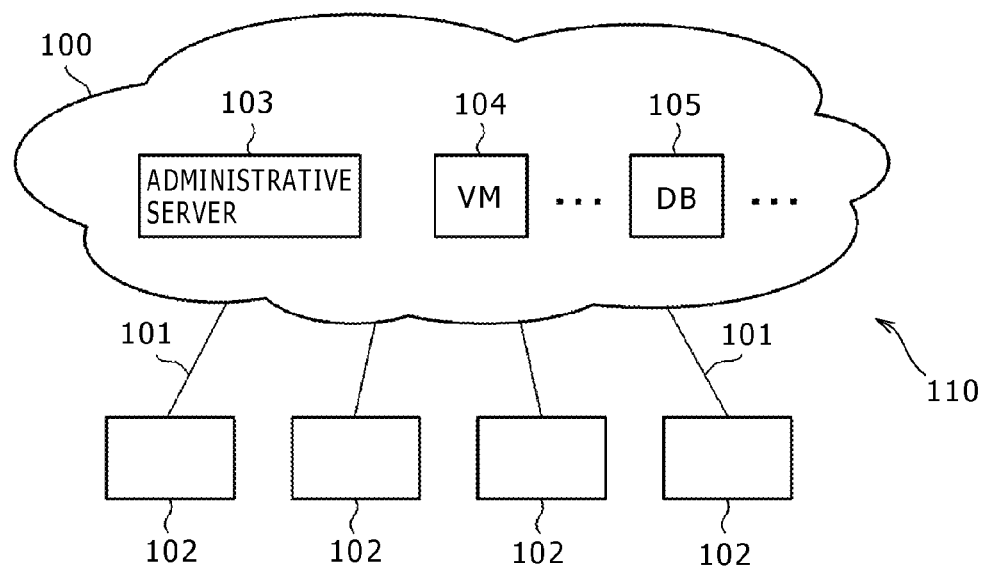
FIG. 1 is a diagram for explaining a typical information processing system as one embodiment of the present invention.

Some embodiments of the present invention are explained below with reference to the accompanying drawings. Like or corresponding elements throughout the drawings are designated by like or corresponding reference characters, and their descriptions will be omitted hereunder where redundant.

FIG. 1 is a diagram for explaining a typical information processing system as one embodiment of the present invention. As shown in FIG. 1, an information processing system 110 embodying the present invention includes a cloud base 100 and one or a plurality of terminals 102. The cloud base 100 and the terminals 102 are interconnected via a network 101. The cloud base 100 includes an administrative server 103, one or a plurality of virtual servers (VM) 104 to be discussed later, and one or a plurality of databases (DB) 105. The cloud base 100 in this context refers to a so-called network-based computer utilization form involving the network 101; this is the base that allows users to utilize computer processing as services via the network.

Figure 2:
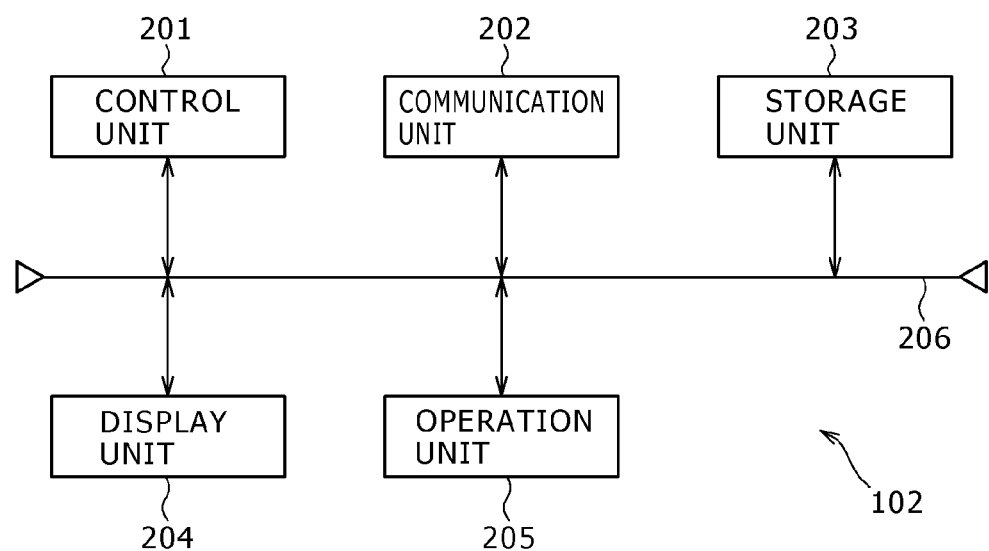
FIG. 2 is a diagram for explaining a configuration of a terminal shown in FIG. 1.

The terminal 102 includes a control unit 201, a communication unit 202, a storage unit 203, a display unit 204, and an operation unit 205, as shown in FIG. 2. The units 201 through 205 are interconnected via a bus 206.

The control unit 201 is a CPU or an MPU, for example, which operates in accordance with program stored in the storage unit 203. The storage unit 203 is composed of an information recording medium such as a hard disk drive, a ROM or a RAM, and serves to store the programs to be executed by the control unit 201. The storage 203 also acts as a work memory for the control unit 201. The programs processed by the control unit 201 may be offered downloaded via the network 101 or provided in the form of a computer-readable information recording medium of diverse kinds such as CD-ROM and DVD-ROM. The operation unit 205 is made up of interfaces such as a keyboard, a mouse, a controller, and buttons. In response to an instruction operation performed by the user, the operation unit 205 outputs the substance of the operation to the control unit 201. The display unit 204 is a liquid crystal display, a CRT display, or an organic EL display, for example, and displays information under instructions from the control unit 201.

It should be noted that the configuration of the terminal 102 above is only an example and is not limitative of the present invention. The database 105 and the administrative server 103 are each configured to include the control unit 201, communication unit 202, and storage unit 203 such as those mentioned above and thus will not be discussed further.

Figure 3:
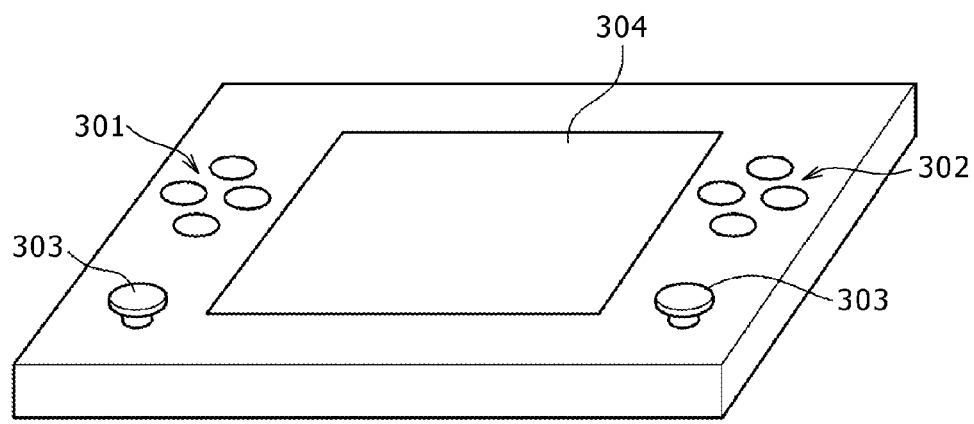
FIG. 3 is a diagram showing a typical appearance of the terminal indicated in FIG. 1.

FIG. 3 is a diagram showing a typical appearance of the terminal. For example, as shown in FIG. 3, the terminal 102 has arrow keys 301, multiple buttons 302, and an analog operation unit 303 making up the operation unit 205, and a display screen 304 constituting the display unit 204. The arrow keys 301 may include an up arrow key, a down arrow key, a right arrow key, and a left arrow key, for example. The user may operate the arrow keys 301 to move, say, an object on the screen upward, downward, rightward or leftward. Also, the multiple buttons 302 may bear markings such as "a," "b," "c" and "d." By operating the buttons 302, the user can execute the process allocated to each of the buttons by the application being executed. Incidentally, the multiple buttons 302 may each be a so-called analog button that can execute a process in a manner varying with the push-down force applied or the push-down distance reached by the user operating the button in question.

The analog operation unit 303 can be tilted from a predetermined reference position, for example. The user may enter input information reflecting the amount and the direction of tilt of the analog operation unit 303 relative to the reference position. For example, the user can tilt an object displayed on the display screen 304 in a desired direction by a desired amount by operating the analog operation unit 303 in the corresponding direction by the corresponding amount of tilt. Further, the display screen 304 corresponds to that of the display unit 204 and may display images relevant to the application, for example.

It should be noted that the appearance of the terminal 102 shown in FIG. 3 and the configurations of the operation unit 205 and of the display unit 204 are only examples and are not limitative of the present invention. Alternatively, the operation unit 205 may be formed by a touch panel displayed on the display unit 204, and the display unit 204 may be the display screen of a monitor or the like constituted by a CRT or a liquid crystal display apparatus. Furthermore, the arrow keys 301, multiple buttons 302, and analog operation unit 303 are not limited in number or in shape, and the terminal 102 may also be furnished with other buttons such as a start button and a select button (not shown) as well as an acceleration sensor or the like.

Figure 4:
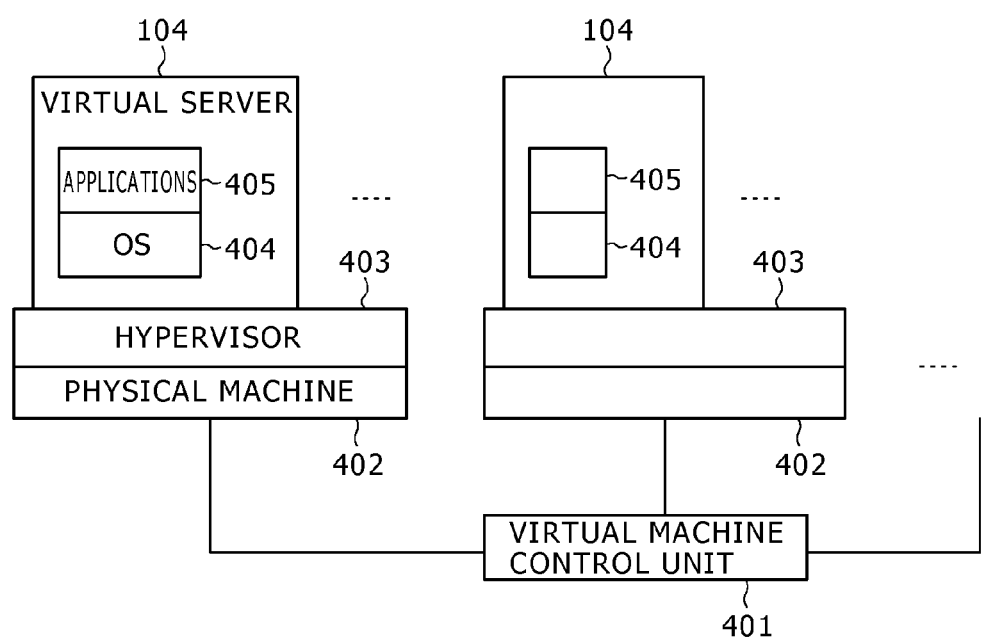
FIG. 4 is a diagram for explaining a virtual server shown in FIG. 1.

FIG. 4 is a diagram for explaining the virtual server shown in FIG. 1. As shown in FIG. 4, the cloud base 100 includes a virtual server control unit 401, and a group of physical machines 402 connected to the virtual server control unit 401. As illustrated in FIG. 4, a hypervisor 403 is provided on each physical machine 402, and one or a plurality of virtual servers (VM) 104 are implemented on the hypervisor 403. In this context, the hypervisor 403 is software that implements and controls the virtual server 104 on each physical machine 402 without recourse to a general-purpose OS. The virtual server 104 is a virtually created set of a CPU and a memory as is well known. Needless to say, each physical machine 402 is a computer made up of a CPU, a memory, and other elements.

Each virtual server 104 has an OS 404 and applications 405. The program to be processed by the virtual server 104 corresponds to one of the applications 405. The virtual server control unit 401 implements one or a plurality of virtual servers 104 on the physical machine 402. Specifically, the implementation is accomplished by the hypervisor 403 controlling the resources of the physical machine 402 (e.g., CPU processing time, memory capacity) allocated to the virtual server 104 by the hypervisor 403.

That is, the programs are installed and executed on the virtual server 104 actually by the physical machine 402, as will be explained below. For example, a plurality of programs including those of this embodiment are stored into the storage unit formed by, say, the memory of the physical machine 402, and these programs are actually executed by one or a plurality of CPU's of the physical machine 402. At this point, the single or multiple CPU's of the physical machine 402 are also used by the multiple programs mentioned above. For example, the processing time of the single or multiple CPU's may be divided and allocated in part to the execution of the programs with this embodiment. It should be noted that the configurations of the virtual server and of the other elements mentioned above are only examples and are not limitative of the present invention.

Figure 5:
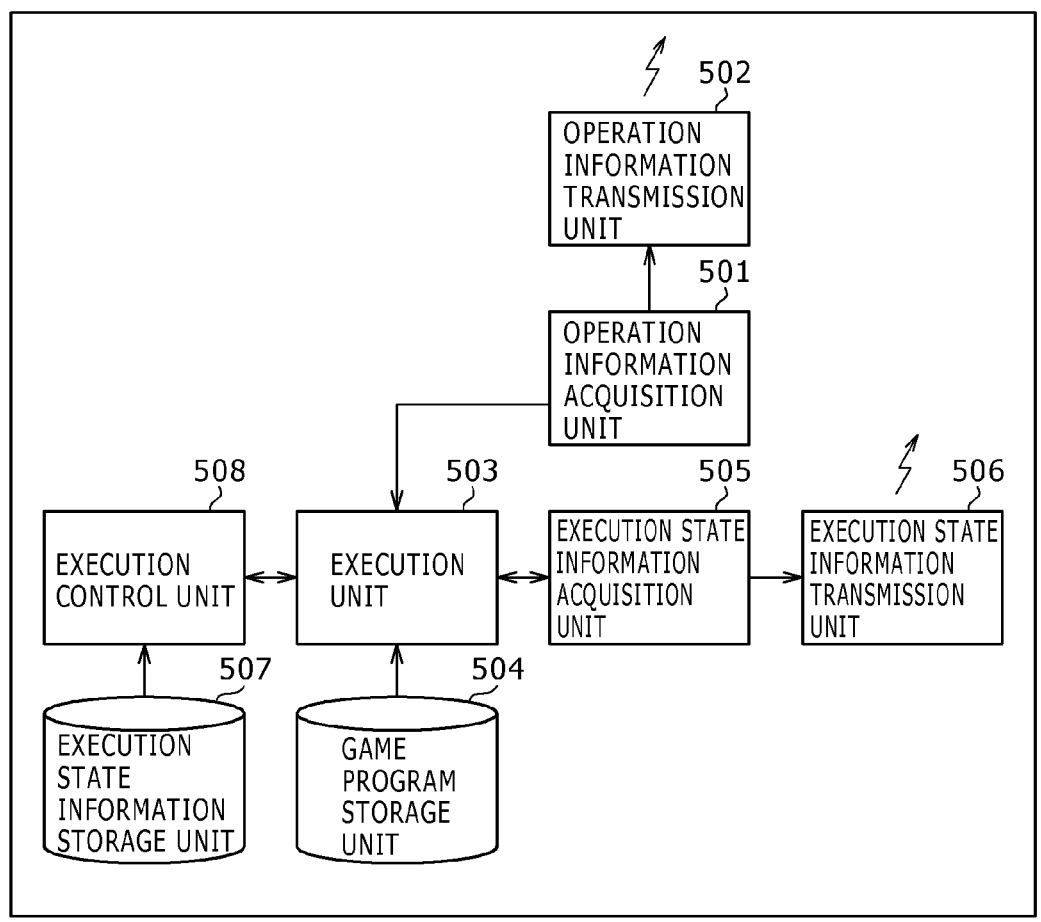
FIG. 5 is a diagram for explaining a typical functional organization of a playing-side terminal.

FIG. 5 is a diagram for explaining a typical functional organization of the terminal on which the user plays games (i.e., playing-side terminal). The playing-side terminal 500 shown in this drawing corresponds to one or a plurality of terminals 102 indicated in FIG. 1. As depicted in FIG. 5, the playing-side terminal 500 includes an operation information acquisition unit 501, an operation information transmission unit 502, an execution unit 503, a game program storage unit 504, an execution state information acquisition unit 505, and an execution state information transmission unit 506.

The operation information acquisition unit 501 sequentially acquires operation information input by the user through the operation unit 205. The operation information may include program identification information for identifying the game selected by the user as well as information for operating an operable character in the game of interest, for example. The operation information transmission unit 502 transmits the operation information input by the user through the operation unit 205 sequentially to the corresponding virtual server 104 via the network 101.

The execution unit 503 acquires the game program selected by the user from the game program storage unit 504, and executes the selected game program in accordance with the operation information acquired by the operation information acquisition unit 501. The execution of the game program by the execution unit 503 generates image information and voice information, for example. In this context, the execution unit 503 corresponds to the emulator or simulator of a dedicated game machine. More specifically, the execution unit 503 corresponds to the game machine implemented virtually on the OS, for example. This point also applies to other execution units 602 and 902, to be discussed later. The game program storage unit 504 stores, for example, one or a plurality of game programs in relation to the program identification information identifying the game program or programs in question. An instruction issued by the user to select the game program includes the program identification information. Based on the program identification information, the execution unit 503 acquires the selected game program from the game program storage unit 504.

In response to a game viewing instruction issued by the user, the execution state information acquisition unit 505 acquires from the execution unit 503 execution state information representing an execution state of the execution unit 503. In this context, the execution state information corresponds to information indicative of the state of the game machine executing the game program being reproduced (e.g., values in the memory, on registers and on the program counter, etc.) by the execution unit 503 including the emulator or simulator. This point also applies to the execution state information about the other execution units 602 and 902, to be discussed later. The game viewing instruction corresponds, for example, to an instruction issued by the playing-side terminal 500 to let a third party view the game being played. In this case, a plurality of play screens on a plurality of playing-side terminals 500 may be distributed to a plurality of viewing-side terminals in the form of a play view list via the virtual server 104, for example, so that the play screens will be transmitted to the viewing-side terminals having made viewing requests. Alternatively, if the user of the playing-side terminal 500 in question is registered as a viewable user in the virtual server 104 in advance or if that user has met predetermined conditions, the virtual server 104 may be arranged to issue the game viewing instruction. Furthermore, the game viewing instruction is only an example and not limitative of the present invention. And as will be discussed later, where the game is to be viewed from the start, the execution state information may be arranged not to be used.

The execution state information transmission unit 506 transmits the execution state information acquired by the execution state 503 to the corresponding virtual server 104. This makes it possible, for example, to acquire the execution state information about the execution unit 503 currently playing the game and transmit the acquired execution state information to the corresponding virtual server 104.

The functional organization of the playing-side terminal 500 is only an example and not limitative of the present invention. Specifically, the playing-side terminal 500 organized as described above may be supplemented with an execution state information storage unit 507 and an execution control unit 508, as shown in FIG. 5. The execution state information storage unit 507 stores one or a plurality of items of execution state information in relation to each game program. Each of these items of execution state information corresponds, for example, to the execution state information about the execution unit 503 in effect at the start of a mini game constituted, for example, by a certain stage of a game program or by part of a game program involving a battle with a predetermined enemy character. And if the user selects a certain mini game, for example, the execution control unit 508 acquires the execution state information corresponding to the selected mini game from the execution state information storage unit 507 and outputs the acquired execution state information to the execution unit 503 for mini game execution. Also, upon determining that the mini game has reached a predetermined ending condition (e.g., predetermined image information or voice information), the execution control unit 508 terminates the mini game in question. Specifically, character recognition, image recognition, or voice recognition may be used for example in performing the determination of the ending condition. These arrangements make it possible to implement a mini game that starts from a predetermined scene of the game program and ends in a predetermined scene (e.g., a certain stage of the game or a battle with a predetermined enemy character).

Figure 6:
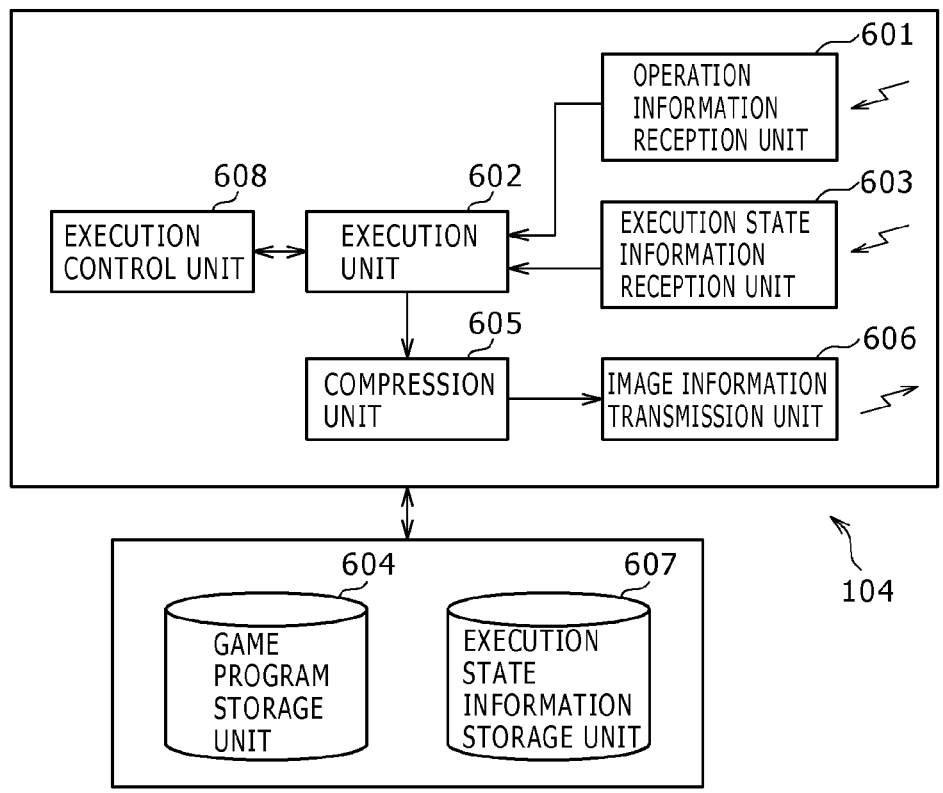
FIG. 6 is a diagram for explaining a typical functional organization of a virtual server.

FIG. 6 is a diagram for explaining a typical functional organization of the virtual server 104 of this embodiment. As shown in FIG. 6, the virtual server 104 includes an operation information reception unit 601, an execution unit 602, an execution state information reception unit 603, a game program storage unit 604, a compression unit 605, and an image information transmission unit 606. The operation information reception unit 601 sequentially receives the operation information transmitted sequentially from the playing-side terminal 500 and outputs the received operation information to the execution unit 602. As mentioned above, the operation information includes the program identification information identifying the game selected by the user. The execution state information reception unit 603 receives the execution state information transmitted from the playing-side terminal 500 and outputs the received execution state information to the execution unit 602. Incidentally, the game program storage unit 604 and the execution state information storage unit 607 may be located in the DB 105, for example.

The execution unit 602 acquires the program identification information acquired by the operation information reception unit 601 and acquires from the game program storage unit 604 the game program identified by the acquired program identification information, for example. And using the execution state information transmitted from the playing-side terminal 500, the execution unit 602 reproduces the execution state information about the execution unit 602 in the virtual server 104. In accordance with the operation information output sequentially from the operation information reception unit 601, the execution unit 602 executes the game program in question. In this manner, the execution state of the execution unit 503 currently executing the game on the playing-side terminal 500 can be reproduced, for example. Later, the game program can be executed using the operation information output sequentially from the operation information reception unit 601. As will be explained later, if the game is to be viewed from the start, the execution state information may be arranged not to be used. The compression unit 605 compresses the moving image information and voice information generated by the execution unit 602 and outputs the compressed information to the image information transmission unit 606. The image information transmission unit 606 transmits the moving image information and other information compressed by the compression unit 605 to the viewing-side terminal, to be discussed later.

It should be noted that the above-described functional organization of the virtual server 104 is only an example and not limitative of the present invention. Specifically, if the playing-side terminal 500 is organized to have the execution state storage unit 507 and execution control unit 508, for example, the virtual server 104 may be arranged to include likewise the execution state information storage unit 607 and an execution control unit 608, as shown in FIG. 6. The execution state information storage unit 607 and the execution control unit 608 are the same as the above-described execution state information storage unit 507 and execution control unit 508 and thus will not be described further. The arrangements above make it possible to execute a mini game constituted by part of the game program that is executed on a dedicated game machine.

Figure 7:
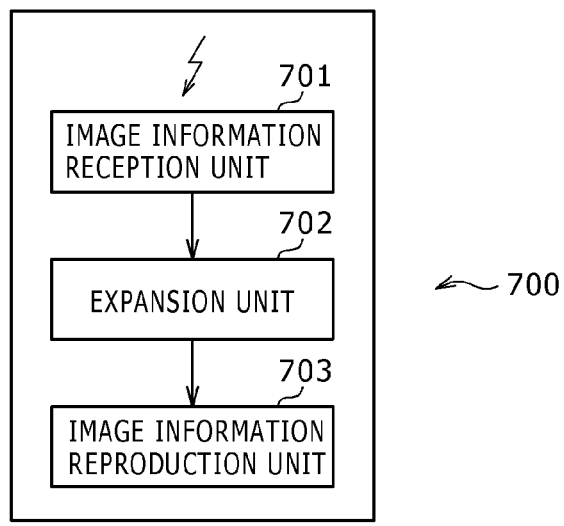
FIG. 7 is a diagram for explaining a typical functional organization of a viewing-side terminal.

FIG. 7 is a diagram for explaining a typical functional organization of the viewing-side terminal. The viewing-side terminal 700 here corresponds to one or a plurality of terminals 102 shown in FIG. 1, for example. As indicated in FIG. 7, the viewing-side terminal 700 functionally includes an image information reception unit 701, an expansion unit 702, and an image information reproduction unit 703. The image information reception unit 701 receives the moving image information and other information transmitted from the image information transmission unit 606 of the virtual server 104. The expansion unit 702 acquires the moving image information and other information received by the image information reception unit 701 and expands the acquired information. The image information reproduction unit 703 reproduces the expanded moving image information and displays the reproduced information on the display unit of the viewing-side terminal 700. In this manner, the play screen of the game being executed on the playing-side terminal 500 can be viewed.

Figure 8:
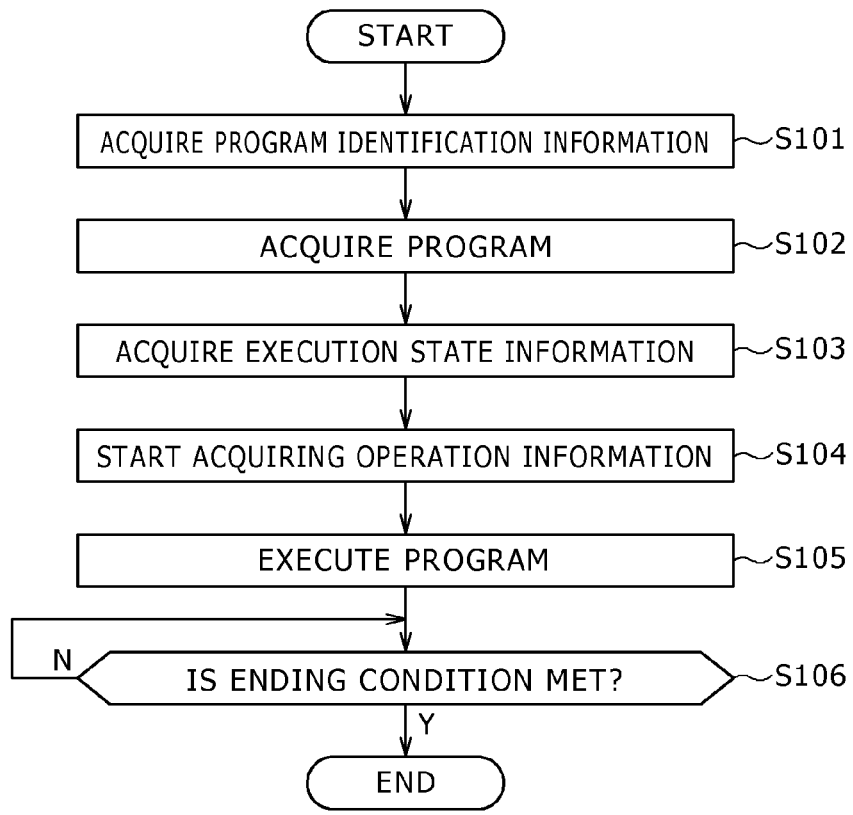
FIG. 8 is a diagram for explaining a typical flow of processing performed by the virtual server.

A typical flow of processing performed by the virtual server 104 is explained next using FIG. 8. First, the operation information reception unit 601 acquires program identification information from the playing-side terminal 500 (S101). The execution unit 602 acquires the game program identified by the program identification information from the game program storage unit 604 (S102). The execution unit 602 acquires the execution state information received by the execution state information reception unit 603 (S103). And the execution unit 602 starts acquiring the operation information acquired sequentially by the operation information reception unit 601 (S104). It should be noted that the processes of S101 through S103 may be performed simultaneously or in a different order.

The execution unit 602 then uses the execution state information to reproduce the execution state of the execution unit 503 on the playing-side terminal 500, and starts executing the game program using the operation information output sequentially from the operation information reception unit 601 (S105). The result of the execution by the execution unit 602 (e.g., moving image information and voice information) is compressed by the compression unit 605 before being transmitted to the viewing-side terminal 700. The viewing-side terminal 700 expands and reproduces the moving image information and other information. In this manner, the game being played on the playing-side terminal 500 can be viewed from the viewing-side terminal 700.

If any predetermined ending condition is determined to be met, the execution unit 602 terminates the execution of the game program (S106). In this context, the predetermined ending conditions include diverse conditions such as the condition based on a decision made by the user at the playing-side terminal 500, the condition based on the provider of this information processing system 110, and the condition based on a decision made by the user at the viewing-side terminal 700. Specifically, the conditions may involve an instruction to stop the distribution because of the user having stopped playing the game on the playing-side terminal 500, a predetermined time period having elapsed since the start of the game, or an instruction to stop viewing the play from the viewing-side terminal 700, for example. Also, where a mini game is being executed as mentioned above, the execution by the execution unit 602 may be arranged to be stopped if any condition regarding the ending of the mini game (e.g., predetermined image information) is detected, for example.

According to the above-described embodiment, even if the status of communication between the playing-side terminal 500 and the virtual server 104 is not good or even if the network bandwidth is narrow, for example, the images of the game being played on the playing-side terminal 500 can be viewed from the viewing-side terminal 700. Specifically, there may well be a case in which so-called streaming distribution of play moving images from the playing-side terminal 500 to the virtual server 104 is impossible because the status of communication between the playing-side terminal 500 and the virtual server 104 is not good or the network bandwidth is narrow, for example. However, since the amount of the execution state information and that of the operation information are considerably smaller than when the image information is being distributed, it may be possible to transmit only the execution state information and the operation information. In that case, this embodiment allows the viewing-side terminal 700 to view the images of the play being performed on the playing-side terminal 500. In another example, even if the status of communication from the viewing-side terminal 700 to the virtual server 104 between the viewing-side terminal 700 and the virtual server 104 is not good, as long as the streaming distribution of the play moving images from the virtual server 104 to the playing-side terminal 500 is available, the images of the play being performed on the playing-side terminal 500 can be viewed from the viewing-side terminal 700.

The present invention is not limited to the above-described embodiment. Alternatively, the invention may be implemented as an embodiment that has substantially the same configuration, offers substantially the same effects, or achieves substantially the same objects as the above-described embodiment. For example, whereas it was explained above that the execution state information is transmitted from the playing-side terminal 500 to the virtual server 104 so that the execution unit 602 of the virtual server 104 executes the game program using the transmitted execution state information, if the game is to be viewed from the start, then the operation information from the start of the execution of the game program on the playing-side terminal 500 may be acquired, the game program may be executed by the virtual server 104 using the sequentially acquired operation information, and the result of the execution of the game program in question may be transmitted to the viewing-side terminal 700. Where the game is to be viewed halfway into playing, the operation information from the start of the execution of the game program on the playing-side terminal 500 may also be acquired before being executed by the execution unit 503 in fast-forward mode so that the game executed using the sequentially acquired operation information may be viewed from the viewing-side terminal 700 halfway into playing.

[First Variation]

A first variation of the above-described embodiment is explained next. With this variation, unlike the above-described embodiment, the playing-side terminal 500 and a viewing-side terminal 900 are directly connected to one another via the network using P2P (peer to peer) technology, for example, without the intervention of the virtual server 104. The viewing-side terminal 900 corresponds to one or a plurality of terminals 102 shown in FIG. 1. Thus, with this variation, unlike the embodiment above, the execution state information transmission unit 506 and operation information transmission unit 502 of the playing-side terminal 500 transmit to the viewing-side terminal 900 the execution state information about the execution unit 503 of the playing-side terminal 500 and the operation information input sequentially to the playing-side terminal 500. The other aspects of the functional organization of the playing-side terminal 500 are the same as those of the above-described embodiment. In the ensuing description, the same points as those of the embodiment above will not be discussed further.

Figure 9:
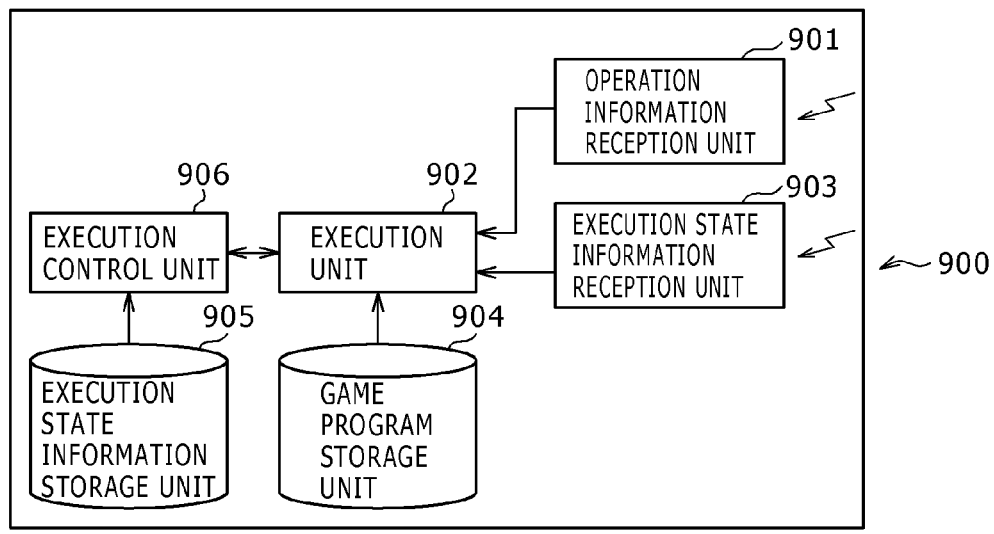
FIG. 9 is a diagram for explaining a typical functional organization of a viewing-side terminal in one variation of the embodiment.

FIG. 9 is a diagram for explaining a typical functional organization of the viewing-side terminal in one variation of the above-described embodiment. As shown in FIG. 9, the viewing-side terminal 900 includes an operation information reception unit 901, an execution unit 902, an execution state information reception unit 903, and a game program storage unit 904. The operation information reception unit 901 sequentially receives the operation information transmitted sequentially from the playing-side terminal 500 and outputs the received operation information to the execution unit 902. As explained above, the operation information includes the program identification information identifying the game selected by the user, for example. The execution state information reception unit 903 receives the execution state information transmitted from the playing-side terminal 500 and outputs the received execution state information to the execution unit 902.

For example, the execution unit 902 acquires the program identification information acquired by the operation information reception unit 901 and acquires the game program identified by the program identification information from the game program storage unit 904. And using the execution state information transmitted from the playing-side terminal 500, the execution unit 902 reproduces the execution state information about the execution unit 503 in the corresponding playing-side terminal 500, and executes the game program in accordance with the operation information output sequentially from the operation information reception unit 901. In this manner, the execution state of the execution unit 503 currently executing the game on the playing-side terminal 500 can be reproduced, for example. Later, the game program can be executed using the operation information output sequentially from the operation information reception unit 901. As with the above-described embodiment, if the game is to be viewed from the start, the execution state information may be arranged not to be used.

It should be noted that the above-described functional organization of the viewing-side terminal 900 is only an example and not limitative of the present invention. Specifically, if the playing-side terminal 500 is organized to have the execution state storage unit 507 and execution control unit 508, for example, the viewing-side terminal 900 may be arranged likewise to include an execution state information storage unit 905 and an execution control unit 906, as shown in FIG. 9. The execution state information storage unit 905 and the execution control unit 906 are the same as the above-described execution state information storage unit 507 and execution control unit 508 and thus will not be described further. The arrangements above make it possible to provide a mini game constituted by part of the game program that is executed on a dedicated game machine.

The processing flow of the viewing-side terminal 900 is basically the same as that of the virtual server 104. However, since the viewing-side terminal 900 includes the display unit 204, the result of the execution by the execution unit 902 is displayed on the display unit 204 of the viewing-side terminal 900 in question. That is, unlike the virtual server 104, the viewing-side terminal 900 has no need for the execution unit 902 to compress or transmit the result of the execution.

According to this variation, even if the status of communication between the playing-side terminal 500 and the viewing-side terminal 900 is not good or even if the network bandwidth is narrow, for example, the images of the play being performed on the playing-side terminal 500 can be viewed from the viewing-side terminal 900. Specifically, there may well be a case in which so-called streaming distribution of play images from the playing-side terminal 500 to the viewing-side terminal 900 is impossible because the status of communication between the playing-side terminal 500 and the viewing-side terminal 900 is not good or the network bandwidth is narrow, for example. However, since the amount of the execution state information and that of the operation information are considerably smaller than when the image information is being distributed, it may be possible to transmit only the execution state information and the operation information. In that case, this variation allows the viewing-side terminal 900 to view the images of the play being performed on the playing-side terminal 500.

The present invention is not limited by the above-described embodiment or by the first variation thereof. Alternatively, the invention may be implemented as an embodiment that has substantially the same configuration, offers substantially the same effects, or achieves substantially the same objects as the embodiment or the first variation thereof discussed above. For example, it was explained above that the execution state information is transmitted from the playing-side terminal 500 to the virtual server 104 or to the viewing-side terminal 900 so that the execution unit 602 or 902 of the virtual server 104 or the viewing-side terminal 900 executes the game program using the transmitted execution state information. Alternatively, if the game is to be viewed from the start, then the operation information from the start of the execution of the game program on the playing-side terminal 500 may be acquired so that the game program may be executed accordingly by the execution unit 902 without recourse to the execution state information.

Whereas the foregoing paragraphs primarily explained the execution and other manipulation of the game program, they can also be applied to other application programs. Further, the playing-side terminal 500 may be organized to include the functionality of the viewing-side terminal 700 or 900 described above. Also, the viewing-side terminal 700 or 900 may be organized to include the functionality of the playing-side terminal 500. The viewing-side terminal 700 or 900 may be further organized to include the configuration of the viewing-side terminal 900 or 700, respectively. Whereas the above paragraphs explained examples in which the invention is embodied using so-called cloud technology involving the virtual server 104, it is possible obviously to implement the above-described embodiment or its variation using an ordinary server-client system. Furthermore, whereas the generated image information was described above as being compressed and expanded, the information may be transmitted without being compressed. Needless to say, this eliminates the need for providing the expansion unit 702. In addition, it was explained above that while the game program is being executed on the playing-side terminal, the play of the game can be viewed from the viewing-side terminal 700 or 900. Alternatively, the image information about the play may be retained by the virtual server 104 or by the viewing-side terminal 900 so that the images of the play can be viewed as designated by the user. Incidentally, the first information processing device described in the claims corresponds to the playing-side terminal 500, for example. The second information processing device described in the claims corresponds to the virtual server 104 or to the viewing-side terminal 900, for example. Also, the third information processing device described in the claims corresponds to the viewing-side terminal 700, for example.

[Second Variation]

A second variation of the above-described embodiment is explained next. The difference between this variation and the above embodiment is that if the playing-side terminal 500 issues an instruction to execute continuously a game program after that game program was executed on the virtual server 104, the game program in question and the data saved therefrom by the virtual server (e.g., execution state information) are transmitted to the playing-side terminal 500 so that the game program of interest can be executed continuously on the playing-side terminal 500. In the ensuing description, the points similar to those of the above-described embodiment or the first variation thereof will not be discussed further and the different points will be mainly explained.

Figure 10:
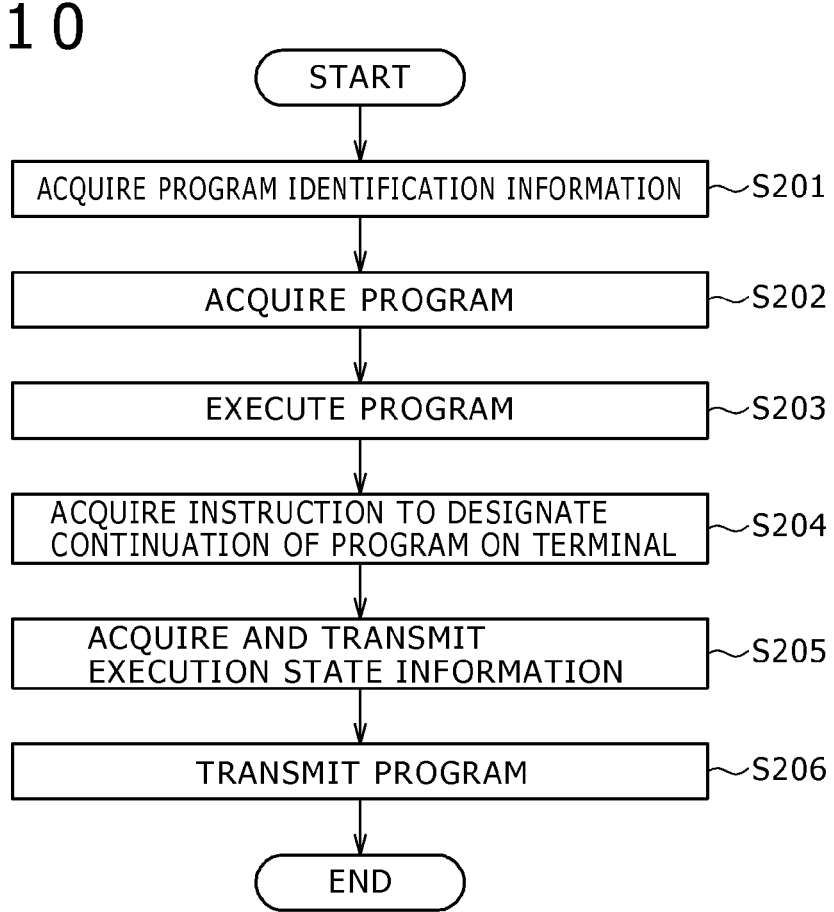
FIG. 10 is a diagram for explaining a typical flow of processing performed by the virtual server in a second variation of the embodiment.

FIG. 10 is a diagram showing a typical flow of processing performed by the virtual server 104 of this variation of the embodiment. It should be noted that the processing flow described below is only an example and this variation is not limited thereby.

As shown in FIG. 10, the operation information reception unit 601 acquires program identification information from the playing-side terminal 500 (S201). Specifically, the user at the playing-side terminal 500 uses this playing-side terminal 500 to designate a desired game program provided by the virtual server 104, for example. The operation information acquisition unit 601 acquires the program identification information corresponding to the designation in question.

The execution unit 602 acquires from the game program storage unit 604 the game program identified by the above-mentioned program identification information (S202) and executes the acquired game program (S203).

The operation information acquisition unit 601 acquires from the playing-side terminal 500 a program continuation instruction denoting continuation of the program (S204). Specifically, upon determining that the game program being executed by the execution unit 603 has reached a predetermined stage, the execution control unit 608 stops the execution of the game program in question by the execution unit 603, and transmits image information querying whether the continuation of the game program is desired to the playing-side terminal 500, for example. And the user, referencing the transmitted image information at the playing-side terminal 500, may issue the above-mentioned program continuation instruction that is acquired by the operation information acquisition unit 601, for example.

More specifically, the predetermined stage mentioned above refers to, say, the end of the play of the initial stage that can be played free of charge in a game program delivered from the virtual server 104 (e.g., the opening or the overture of a new RPG (Role-Playing Game)). In such a case, the above-mentioned image information may be image information constituting a game purchase screen, for example. The user may issue a purchase instruction through the purchase screen so that the game in question can be played continuously as per the purchase instruction.

In response to the program continuation instruction mentioned above, the execution control unit 608 acquires the execution state information regarding the game program on the execution unit 602 of the virtual server 104 and transmits the acquired information to the playing-side terminal 500 (S205).

Also in response to the program continuation instruction, the execution control unit 608 acquires from the game program storage unit 604 the game program that was or is currently executed by the execution unit 603 and transmits the acquired game program to the playing-side terminal 500 (S206). That is, the game program in question is downloaded to the playing-side terminal 500. The processing is then terminated.

Figure 11:
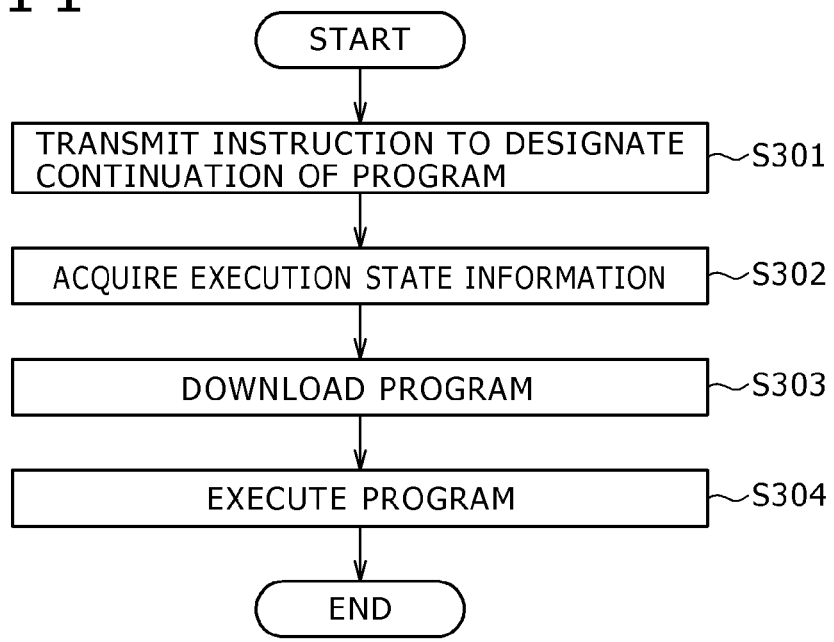
FIG. 11 is a diagram for explaining a flow of processing performed by the playing-side terminal in the second variation of the embodiment.

A typical flow of processing performed by the playing-side terminal 500 of this variation is explained next using FIG. 11. It should be noted that the processing flow described below is only an example and this variation is not limited thereby.

First, the operation information transmission unit 501 transmits a program continuation instruction in response to the user's instruction (S301). Specifically, the virtual server 104 may transmit image information prompting the continuation instruction, for example. When the user issues the continuation instruction based on the image information displayed on the display unit 204, the operation information transmission unit 501 transmits the program continuation instruction.

The execution state information acquisition unit 505 acquires the execution state information from the virtual server 104 (S302). Specifically, for example, in the case of the examples discussed above, the execution state information may include the execution state information in effect when the play of a predetermined stage has ended (e.g., information about the character in the game program, information about the level reached, and information about the experience points gained).

The game program storage unit 504 stores the game program downloaded from the virtual server 104 (S303). The execution unit 503 executes the game program (S304) downloaded in step S303 using the execution state information acquired in step S302.

This variation of the present invention allows the playing-side terminal 500 to execute continuously the game program that has been executed on the virtual server 104. More specifically, after playing a given game program by way of trial, the user may decide to purchase the game for example. In such a case, the purchased game program can be played on the user's terminal in a manner reflecting the state in which the game program was executed on trial before the purchase. This eliminates the need for the user to again play the game from the start after the purchase, which can enhance the willingness of prospective buyers to purchase the game programs they play as a trial. That is, according to this variation, the data saved from the game played on the virtual server 104 (i.e., cloud game) can be inherited to the purchased game to be played on a local terminal, for example.

The present invention is not limited to the above-described variation; there can be many other variations and alternatives. For example, whereas FIG. 10 shows the process in which the execution state information is acquired in step S205 and the program is transmitted in step S206, the sequence may be reversed so that the program is first transmitted, followed by transmission of the execution state information. Likewise, whereas FIG. 11 shows the process in which the execution state information is acquired in step S302 and then the program is downloaded in step S303, the sequence may be reversed so that the program is first downloaded, followed by acquisition of the execution state information.

As another example, the game of interest may be arranged to be played continuously on the virtual server 104 until the download of the game program in question is completed. Specifically, the download of the game program and the execution thereof on the virtual server 104 may be arranged to proceed in parallel, for example. Alternatively, the play of the game on the virtual server 104 may be arranged to transition seamlessly to the play of the game on the playing-side terminal 500. In this case, a scene change in the game, for example, may be used as the timing for switching the execution of the game program from the virtual server 104 to the playing-side terminal 500.

Further, where a plurality of cloud games are offered by the virtual server 104 as a service that permits playing of the games for a predetermined time period, it may be desired that one of the cloud games be played on the playing-side terminal 500 while the user is on the road. In this case, it may be arranged that the game program of interest is downloaded to the playing-side terminal 500 and that the execution state information about that game program on the virtual server 104 is acquired. This allows the playing-side terminal 500 to inherit the play of the game program in question from the virtual server 104. In this case, the virtual server 104 may be arranged to further inherit the data saved from the game played on the inheriting playing-side terminal 500 as well as the execution state information representing the result of the play on the playing-side terminal 500.

Furthermore, whereas the foregoing paragraphs explained the game program, they can also be applied to other application programs. Incidentally, the first information processing device described in the claims corresponds to the virtual server 104, and the second information processing device described in the claims corresponds to the playing-side terminal 500, for example.

The present invention is not limited to the above-described embodiment or to the first and the second variations thereof. Alternatively, the invention may be implemented as any embodiment or variation that has substantially the same configuration, offers substantially the same effects, or achieves substantially the same objects as the embodiment discussed above. For example, the above-described embodiment and the first and the second variations thereof may be applied to the ordinary server-client system as mentioned above.

The invention claimed is:

1. An information processing system comprising:
a first information processing device including: (i) a first operation information acquisition section which sequentially acquires operation information input by a first user, (ii) a first execution section which executes an application using the operation information acquired sequentially by the first operation information acquisition section to affect gameplay of the first user, (iii) an operation information transmission section which sequentially transmits the operation information via a network, (iv) a first execution state information acquisition section which acquires execution state information representing an execution state of the first execution section, and (v) an execution state information transmission section which transmits via the network the execution state information acquired by the first execution state information acquisition section; and a second information processing device including: (i) a second operation information acquisition section which sequentially acquires the operation information transmitted from the first operation information transmission section, (ii) a second execution section which executes the application in a manner reproducing the application being executed by the first execution section using the operation information acquired sequentially by the second operation information acquisition section, such that a second user of the second information processing device may view the gameplay of the first user without engaging in the gameplay, (iii) a second execution state information acquisition section which acquires the execution state information from the first execution state information transmission section, wherein the execution state information includes data regarding respective states of the gameplay of the first user at a plurality of different points in the execution of the application, and the execution state information includes values in memory, on registers and on a program counter of the first execution section, but does not include images produced through the execution of the application by the first execution section, and the second information processing device permits the second user to select from among the plurality of different points in the execution of the application in order to start the view of the gameplay of the first user at such selected point.

2. The information processing system according to claim 1, wherein the second information processing device further includes an image information transmission section which transmits image information based on the execution of the application by the second execution section, and the information processing system further comprises a third information processing device including an image information reproduction section which reproduces the image information from the image information transmission section, and a display section which displays the image information reproduced by the image information reproduction section.

3. The information processing system according to claim 1, wherein the second information processing device further includes an image information display section based on the execution of the application by the second execution section, and the image information display section displays the image information while the application is being executed by the first execution section.

4. The information processing system according to claim 2, wherein the image information reproduction section reproduces the image information from the image information transmission section while the application is being executed by the first execution section.

5. The information processing system according to claim 1, wherein the first information processing device further includes an execution state information storage section which stores execution state information representing a predetermined execution state of the first execution state, and the first execution section executes the application using the stored execution state information.

6. An information processing method comprising:

causing a first operation information acquisition section sequentially to acquire operation information input by a user;

causing a first execution section to execute an application using the operation information acquired sequentially by the first operation information acquisition section to affect gameplay of the first user;

causing an operation information transmission section sequentially to transmit the operation information via a network;

causing a first execution state information acquisition section to acquire execution state information representing an execution state of the first execution section;

causing an execution state information transmission section to transmit via the network the execution state information acquired by the first execution state information acquisition section;

causing a second operation information acquisition section sequentially to acquire the operation information transmitted from the first operation information transmission section;

causing a second execution section to execute the application in a manner reproducing the application being executed by the first execution section using the operation information acquired sequentially by the second operation information acquisition section, such that a second user of the second information processing device may view the gameplay of the first user without engaging in the gameplay; and causing a second execution state information acquisition section to acquire the execution state information from the first execution state information transmission section;

wherein the first operation information acquisition section, the first execution section, the operation information transmission section, the first execution state information acquisition section, and the execution state information transmission section are included in a first information processing device, and whereas the second operation information acquisition section, the second execution section, and the second execution state information acquisition section are included in a second information processing device, wherein the execution state information includes data regarding respective states of the gameplay of the first user at a plurality of different points in the execution of the application, and the execution state information includes values in memory, on registers and on a program counter of the first execution section, but does not include images produced through the execution of the application by the first execution section, and the second information processing device permits the second user to select from among the plurality of different points in the execution of the application in order to start the view of the gameplay of the first user at such selected point.

7. A non-transitory, computer readable storage medium containing an information processing program, which when executed by a computer system, causes the computer system to carry out actions, comprising:
   causing a first operation information acquisition section sequentially to acquire operation information input by a first user;
   causing a first execution section to execute an application using the operation information acquired sequentially by the first operation information acquisition section to affect gameplay of the first user;
   causing an operation information transmission section sequentially to transmit the operation information via a network;
   causing a first execution state information acquisition section to acquire execution state information representing an execution state of the first execution section;
   causing an execution state information transmission section to transmit via the network the execution state information acquired by the first execution state information acquisition section;
   causing a second operation information acquisition section sequentially to acquire the operation information transmitted from the first operation information transmission section;
   causing a second execution section to execute the application in a manner reproducing the application being executed by the first execution section using the operation information acquired sequentially by the second operation information acquisition section, such that a second user of the second information processing device may view the gameplay of the first user without engaging in the gameplay; and
   causing a second execution state information acquisition section to acquire the execution state information from the first execution state information transmission section;
   wherein the first operation information acquisition section, the first execution section, the operation information transmission section, the first execution state information acquisition section, and the execution state information transmission section are included in a first information processing device, and whereas the second operation information acquisition section, the second execution section, and the second execution state information acquisition section are included in a second information processing device,
   wherein the execution state information includes data regarding respective states of the gameplay of the first user at a plurality of different points in the execution of the application, and the execution state information includes values in memory, on registers and on a program counter of the first execution section, but does not include images produced through the execution of the application by the first execution section, and
   the second information processing device permits the second user to select from among the plurality of different points in the execution of the application in order to start the view of the gameplay of the first user at such selected point.

8. A first information processing device comprising:
   a first operation information acquisition section which sequentially acquires operation information input by a first user;
   a first execution section which executes an application using the operation information acquired sequentially by the first operation information acquisition section to affect gameplay of the first user;
   an operation information transmission section which sequentially transmits the operation information via a network;
   a first execution state information acquisition section which acquires execution state information representing an execution state of the first execution section; and
   an execution state information transmission section which transmits via the network the execution state information acquired by the first execution state information acquisition section, wherein:
   the operation information transmitted from the first operation information transmission section being acquired sequentially by a second operation information acquisition section included in a second information processing device, the application being executed by a second execution section included in the second information processing device in a manner reproducing the application being executed by the first execution section using the operation information acquired sequentially by the second operation information acquisition section, such that a second user of the second information processing device may view the gameplay of the first user without engaging in the gameplay,
   the second information processing device including a second execution state information acquisition section which acquires the execution state information from the first execution state information transmission section,
   the execution state information includes data regarding respective states of the gameplay of the first user at a plurality of different points in the execution of the application, and the execution state information includes values in memory, on registers and on a program counter of the first execution section, but does not include images produced through the execution of the application by the first execution section, and
   the second information processing device permits the second user to select from among the plurality of different points in the execution of the application in order to start the view of the gameplay of the first user at such selected point.

9. A second information processing device comprising:
   a second operation information acquisition section which sequentially acquires operation information transmitted from a first information processing device via a network, wherein the first information processing device includes: (i) a first operation information acquisition section which sequentially acquires the operation information input by a first user, (ii) a first execution section which executes an application using the operation information acquired sequentially by the first operation information acquisition section to affect gameplay of the first user, (iii) an operation information transmission section which sequentially transmits the operation information via a network, (iv) a first execution state information acquisition section which acquires execution state information representing an execution state of the first execution section, and (v) an execution state information transmission section which transmits via the network the execution state information acquired by the first execution state information acquisition section;
   a second execution section which executes an application using the operation information acquired sequentially by the second operation information acquisition section, such that a second user of the second information processing device may view the gameplay of the first user without engaging in the gameplay; and a second execution state information acquisition section which acquires the execution state information from the first execution state information transmission section, wherein the execution state information includes data regarding respective states of the gameplay of the first user at a plurality of different points in the execution of the application, and the execution state information includes values in memory, on registers and on a program counter of the first execution section, but does not include images produced through the execution of the application by the first execution section, and the second information processing device permits the second user to select from among the plurality of different points in the execution of the application in order to start the view of the gameplay of the first user at such selected point.

\* \* \* \* \*